US006115007A

United States Patent [19]
Yamazaki

[11] Patent Number: 6,115,007
[45] Date of Patent: Sep. 5, 2000

[54] HEAD MOUNTED DISPLAY SYSTEM WITH VARIED PIXEL WIDTH

[75] Inventor: Shunpei Yamazaki, Tokyo, Japan

[73] Assignee: Semiconductor Energy Laboratory Co., Ltd., Kanagawa-ken, Japan

[21] Appl. No.: 08/948,617

[22] Filed: Oct. 10, 1997

[30] Foreign Application Priority Data

Oct. 16, 1996 [JP] Japan ................................. 8-294548

[51] Int. Cl.[7] ............................... G09G 3/36; G09G 3/04
[52] U.S. Cl. ................................ 345/7; 345/8; 345/43; 345/103; 345/149; 349/11; 349/13; 349/15
[58] Field of Search .................................. 345/7–9, 149, 345/103, 43; 359/13; 349/11–15, 84; 348/53

[56] References Cited

U.S. PATENT DOCUMENTS

| | | | |
|---|---|---|---|
| 4,028,725 | 6/1977 | Lewis | 345/8 |
| 5,071,209 | 12/1991 | Chang et al. | 359/19 |
| 5,499,037 | 3/1996 | Nakagawa et al. | 345/87 |
| 5,726,670 | 3/1998 | Tabata et al. | 345/7 |
| 5,751,272 | 5/1998 | Silverbrook et al. | 345/149 |
| 5,805,136 | 9/1998 | Silverbrook et al. | 345/149 |
| 5,808,589 | 9/1998 | Fergason | 345/8 |
| 5,808,594 | 9/1998 | Tsuboyama et al. | 345/149 |

OTHER PUBLICATIONS

Kabushiki Kaisha Press, Monthly LCD Intelligence, Oct. 1996, pp. 59–64.
Kikkie Electronics, Aug. 1996, pp. 135–138.

*Primary Examiner*—Bipin Shalwala
*Assistant Examiner*—David L. Lewis
*Attorney, Agent, or Firm*—Fish & Richardson P.C.

[57] ABSTRACT

With a head mount display, a difference in an effective area of pixels depending on a horizontal angle of view is corrected. In an active matrix region 106, a horizontal width e of a pixel electrode in a region where the horizontal angle of view becomes large is set to be larger than a horizontal width d of pixels in a region where the horizontal angle of view becomes small. With this arrangement, a difference in a visual area of the pixel electrode caused by the horizontal angle of view can be corrected.

10 Claims, 5 Drawing Sheets

HEAD MOUNTED DISPLAY SYSTEM WITH VARIED PIXEL WIDTH

BACKGROUND OF THE INVENTION

1. Field of the Invention

The present invention relates to a display system, which is called "a head mount display", which is put on a human head for displaying an image in front of his eyes.

2. Description of the Related Art

There has been known a display system using a small liquid-crystal panel, which is called "a head mount display (HMD)" (for example, refer to an article disclosed in the October issue of a "Monthly LCD Intelligence" published from Kabushiki Kaisha Press Journal in October 1996, pp. 59 to 64).

The display system as disclosed there is designed such that an image is displayed at a location apart forward from eyes by about several centimeters to recognize a virtual realistic image. Such a display system is applicable to something to play such as a TV game, movie seeing, education, presentation or medical treatment.

As a method of displaying an image using the HMD, there is a 3D (three-dimensional image) technique. In this case, a horizontal angle of visibility ranging from 60 to 90° is required.

However, the head mount display suffers from such a problem that the effective area (a visual area) of pixels is caused to change according to an angle of view since a distance between the liquid-crystal panel and eyes is short to the degree of about several centimeters.

The above problem causes that the visual feeling of the image is different or an unfamiliar feeling occurs depending on the horizontal angle of view.

In the general liquid-crystal display, since a distance between eyes and a screen is far to the degree of several ten centimeters or longer, the above-mentioned difference in the effective area of pixels according to a difference of the horizontal angle of view does not cause any problems.

SUMMARY OF THE INVENTION

The present invention has been made in view of the above problem with the conventional display system, and therefore an object of the present invention is to provide a technique of correcting a difference in the effective area of pixels depending on the horizontal angle of view, which causes a problem in the above-mentioned head mount display.

In order to solve the above problem, according to one aspect of the present invention, there is provided a display system that is put on a head of an operator, which comprises: flat panel displays for right and left eyes, wherein a horizontal dimension of pixels of the flat panel displays is set to be continuously or gradually varied according to a horizontal angle of view from a predetermined position.

According to another aspect of the present invention, there is provided a display system that is put on a head of an operator, which comprises: flat panel displays for right and left eyes, wherein a horizontal dimension of pixels of the flat panel displays is set to be continuously or gradually varied from an inside thereof to an outside thereof according to a horizontal angle of view.

According to still another aspect of the present invention, there is provided a display system wherein a horizontal dimension of pixels of the flat panel displays is set to be continuously or gradually varied in correspondence with a horizontal angle of view from a position where the horizontal angle of view is zero.

According to yet still another aspect of the present invention, there is provided a display system that is put on a head of an operator, which comprises: flat panel displays for right and left eyes, wherein each of the flat panel displays comprises an active matrix liquid-crystal display unit which is integrated with a peripheral drive circuit; and wherein the peripheral drive circuits are disposed symmetrically with respect to a line according to an axis in said flat panel displays for right and left eyes.

In the above structure, it is effective that a horizontal dimension of pixels of the flat panel display is set so as to be continuously or gradually changed according to the horizontal angle of view in accordance with the axis.

Also, it is effective that a horizontal dimension of pixels of the flat panel display is set so as to be continuously or gradually changed according to the horizontal angle of view from a position where the horizontal angle of view is zero.

DETAILED DESCRIPTION OF THE PREFERRED EMBODIMENTS

Figure 1:
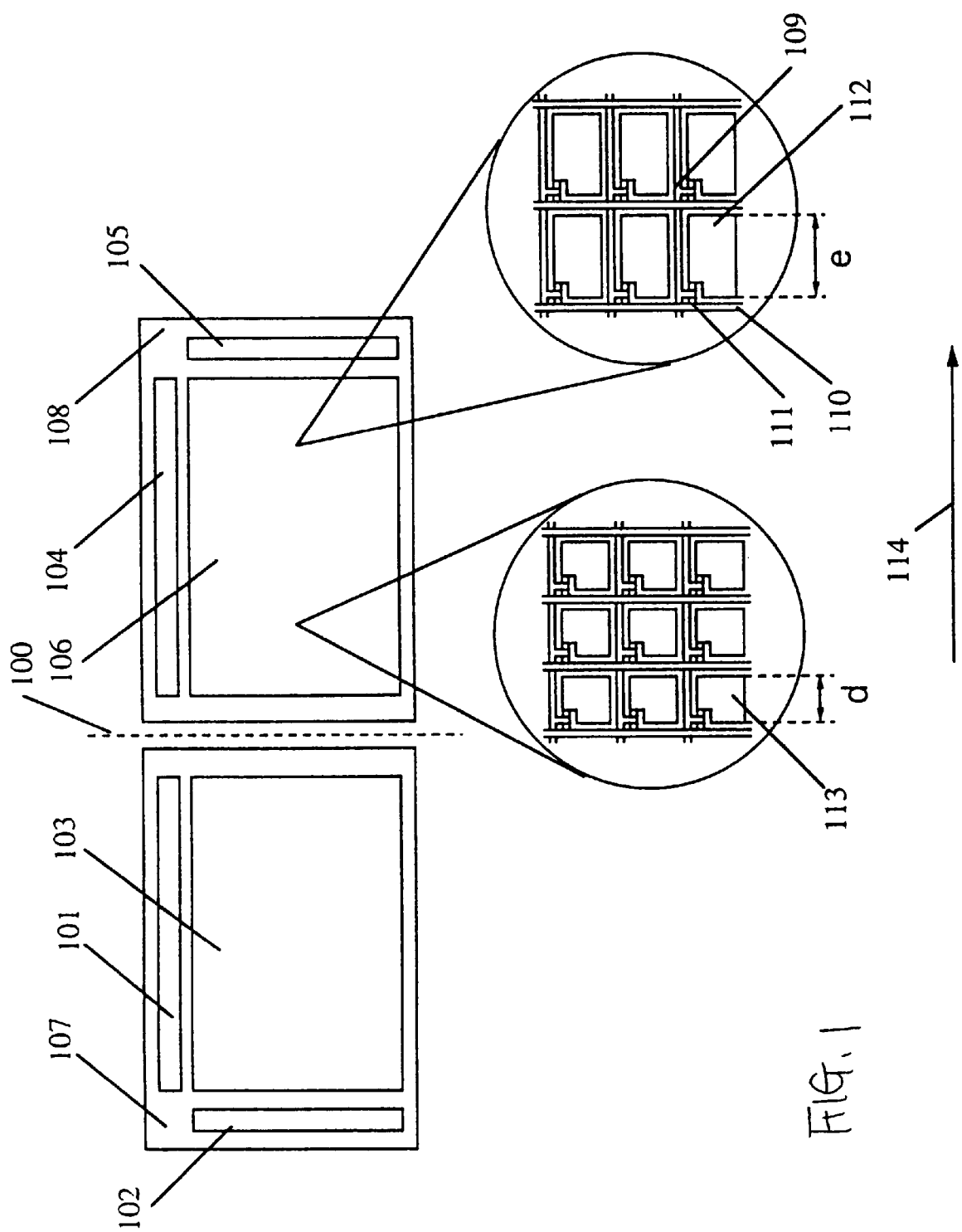
FIG. 1 is a diagram showing a structure in which a liquid-crystal panel is arranged in the first embodiment.

According to the present invention, as shown in FIG. 1, in liquid-crystal panels for right and left eyes which are disposed in a head mount display, widths of pixel electrodes which are indicated by symbols d and e are successively increased in a direction along which a horizontal angle of view increases, thereby being capable of correcting a difference in a visual area of the pixel electrodes which is caused by a difference in the horizontal angle of view.

First Embodiment

Figure 2:
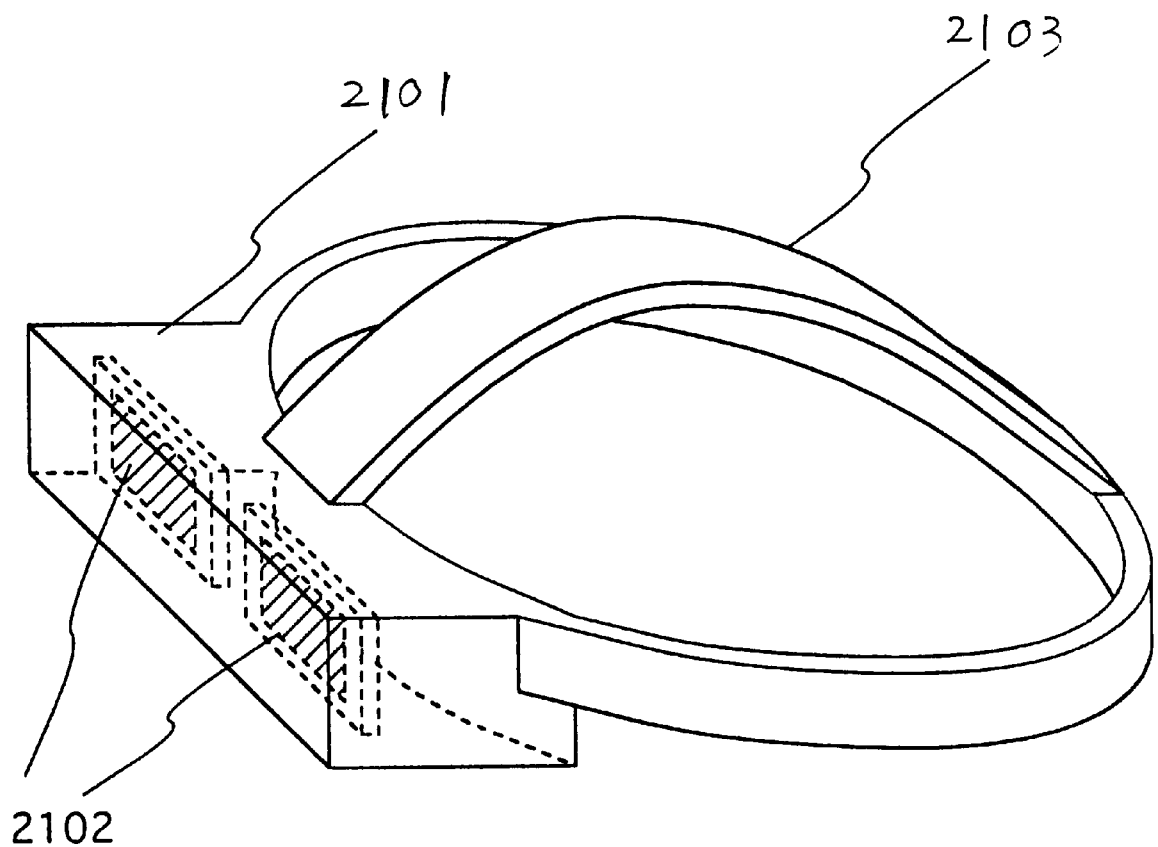
FIG. 2 is a diagram showing the outline of a head mount display.

FIG. 2 shows an outline of a head mount display according to a first embodiment of the present invention. The structure shown in FIG. 2 includes a band 2103 for fixing a main body 2101 to an operator's head, and an active matrix liquid-crystal panel 2102 for displaying an image.

A single liquid-crystal panel for his right eye and a single liquid-crystal panel for his left eye are disposed. As a method of disposing the liquid-crystal panel, there is a system in which an image optically modulated is projected on a mirror or a half mirror, and the projected image is viewed by his eyes, as a structure other than that shown in the figure. Likewise, the liquid-crystal panels are disposed in the main body 2101.

Also, although being not shown, a memory in which an image is stored (a photomagnetic storage medium or a magnetic storage medium) and a TV tuner are separately provided and structured together with the main body 2101 into a system.

As a system of the liquid-crystal panel, a transmission type that requires a back light is generally employed. Instead, a reflection type may be employed.

As a device for forming an image, the liquid-crystal panel can be replaced by an EL (electro-luminance) panel or an EC (electro-chromics) panel. It is preferable that those display units (which is generally called "a flat panel display") are of the active matrix type.

In the structure according to this embodiment, a structure of two liquid-crystal panel which are indicated by reference numeral 2102, in particular, a structure relating to the arrangement of pixels is designed as shown in FIG. 1.

In FIG. 1, reference numeral 107 denotes a glass substrate (or quartz substrate) of a liquid-crystal panel for a left eye. Peripheral drive circuits 101 and 102 are disposed on the substrate 107. Also, an active matrix region (pixel matrix region) 103 is disposed thereon.

Similarly, reference numeral 108 denotes a glass substrate (or quartz substrate) of a liquid-crystal panel for a right eye. Peripheral drive circuits 104 and 105 are disposed on the substrate 108. Also, an active matrix region (pixel matrix region) 106 is disposed thereon.

The active matrix region is designed such that gate lines 109 and source lines 110 are disposed in the form of a lattice, and a thin-film transistor 111 is disposed in the vicinity of each of their cross points. The thin-film transistor is designed to control the amount of charges which are held by a pixel electrode 112.

An important matter in this structure resides in that the peripheral drive circuits are disposed symmetrically with respect to an axis 100 that extends between the right and left liquid-crystal panels. In general, the axis 100 substantially coincides with a line that vertically divides the center of an operator's face into two.

With the above arrangement, the structure of the right liquid-crystal panel viewed by the right eye can be made symmetrical with the structure of the left liquid-crystal panel viewed by the left eye. Also, the arrangement of the liquid-crystal panel can be made symmetrical with the symmetrical axis 100.

This is important in ensuring the structural balance. In particular, in the head mount display, since the position of the liquid-crystal panels is close to the eyes, that arrangement becomes important.

Also, the structure of the active matrix region (in this example, the right liquid-crystal panel is particularly shown) 106 is characterized as follows:

That is, the pixels inside (a region close to the symmetrical axis 100) of the active matrix region 106 are designed such that the width d along the horizontal direction is set to be narrow (small) as indicated by reference numeral 113. That is, the width d is set so that the pixel area becomes small.

On the contrary, the pixels outside (a region far from the symmetrical axis 100) of the active matrix region 106 are designed such that the width e along the horizontal direction is set to be wide (large) as indicated by reference numeral 112. That is, the width e is set so that the pixel area becomes large.

This is devised so that the visual area of pixels is made identical or substantially identical between an area where the horizontal angle of view is small and an area where it is large.

Figure 4:
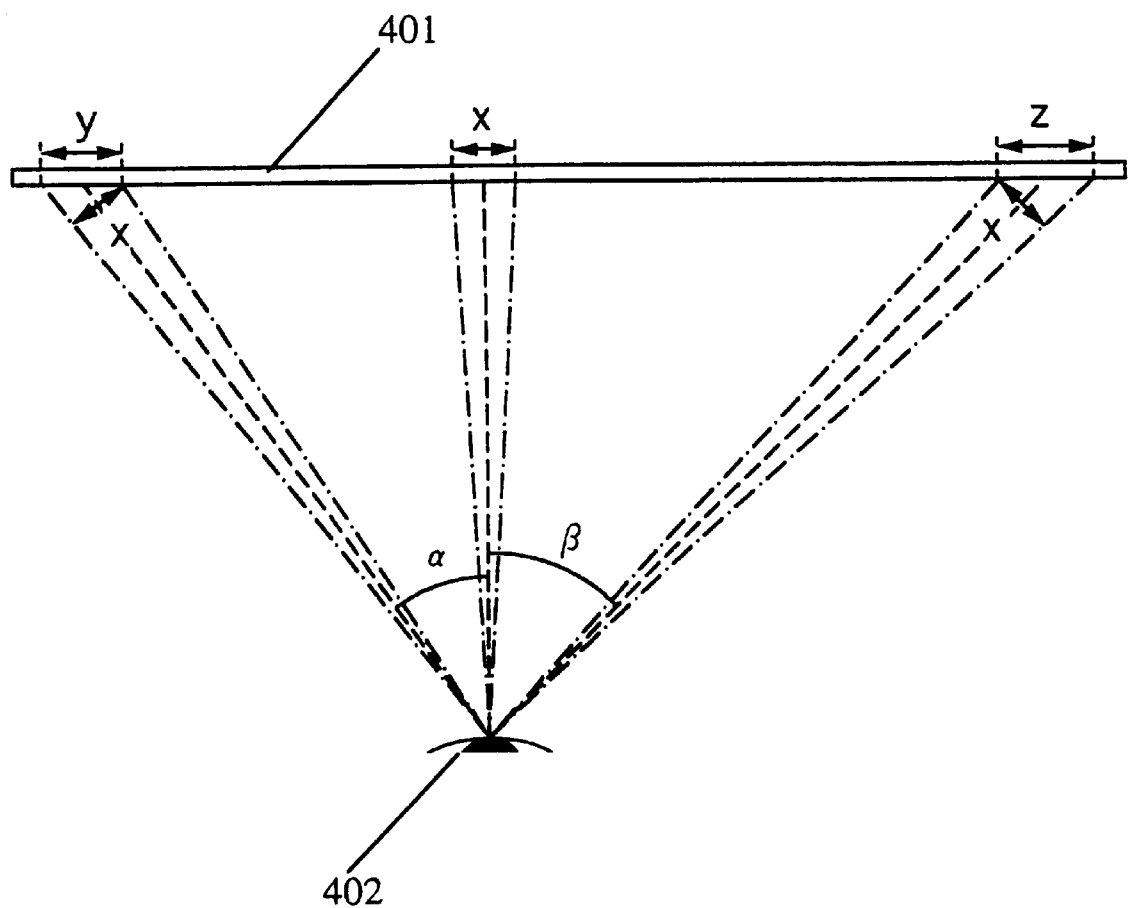
FIG. 4 is a diagram showing a relation between the respective horizontal view and the dimensions of pixels.

This principle will be described with reference to FIG. 4. FIG. 4 shows a relation of the horizontal angles of view $\alpha$ and $\beta$ of the eye-balls 402 with respect to the liquid-crystal panel 401, and a relation between the horizontal dimension of the visual pixels and the horizontal dimension of the actual pixels.

In FIG. 4, what is indicated by symbol X is a visual horizontal dimension of pixels when the horizontal angle of view is 0°. In this case, the actual horizontal dimension of pixels and the visual horizontal dimension of pixels are identical with each other by a value X.

In this example, it is assumed that a point of view is moved by the horizontal angle of view which is indicated by symbol $\beta$. In this case, in order to obtain the visual horizontal dimension X of pixels, the actual horizontal dimension of pixels must be z. Incidentally, the rough relation of x and z is z cos $\beta$=x.

Likewise, it is assumed that a point of view is moved by the horizontal angle of view which is indicated by symbol $\alpha$. In this case, in order to obtain the visual horizontal dimension y of pixels, the actual horizontal dimension of pixels as required must be y. Incidentally, the rough relation of x and y is y cos $\beta$=x.

In this way, in the case where a distance between the eye-balls and the liquid-crystal panels is short, the visual horizontal dimension of the pixel electrode due to a difference in the horizontal angle of view becomes remarkable.

However, with application of the structure shown in FIG. 1, the difference in the horizontal dimension of the pixel electrode can be corrected.

Then, the warp of an image in an area where the horizontal angle of view is large and unfamiliar feeling can be suppressed.

What is shown in FIG. 1 is a structure which is effective when the positional relation between the eye-balls and the liquid-crystal panels is set such that the angle of view becomes large toward a direction 114.

The degree of a change in the dimension of pixels may be continuous or gradual.

Second Embodiment

Figure 3:
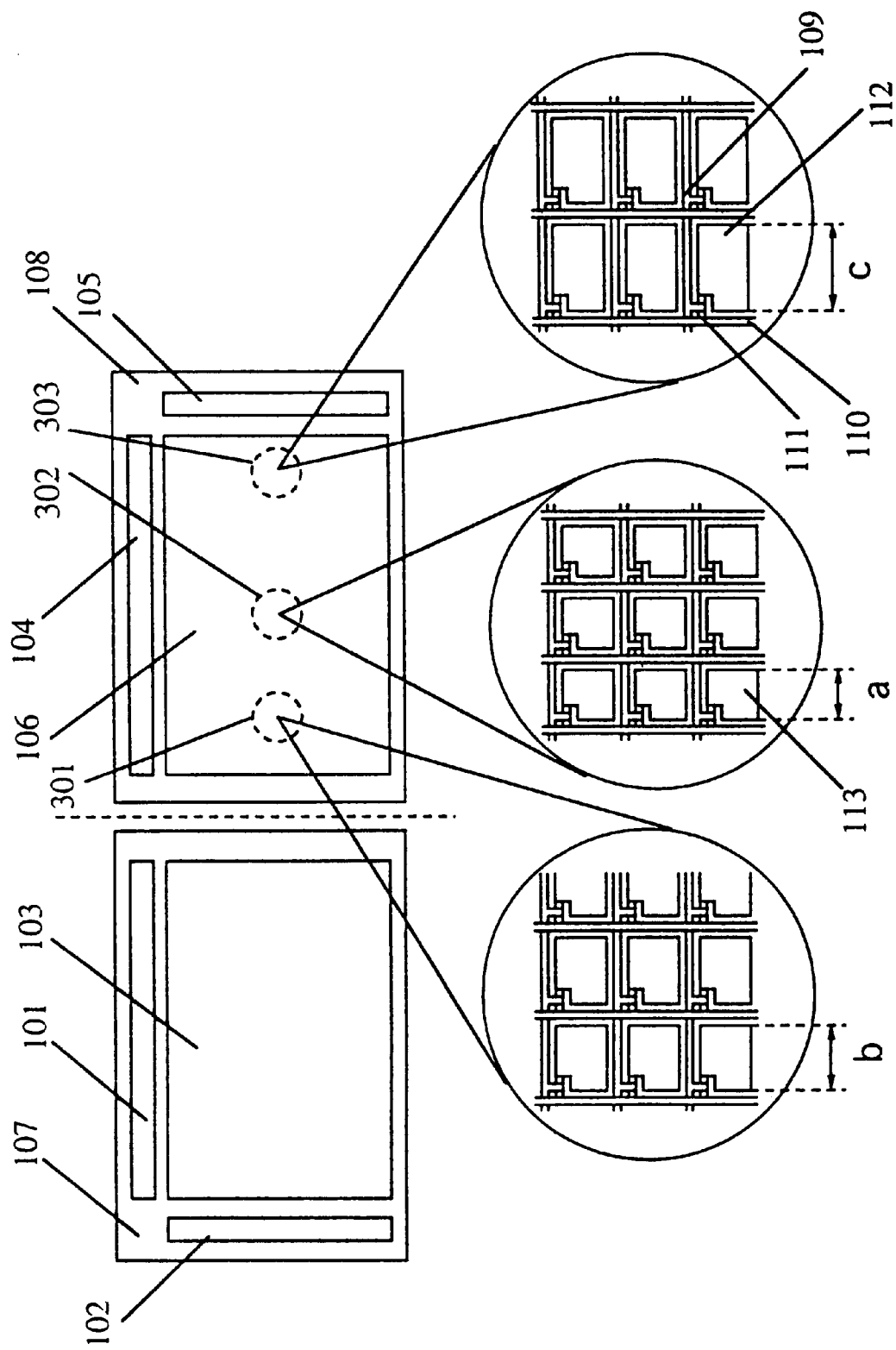
FIG. 3 is a diagram showing a structure in which a liquid-crystal panel is arranged in the second embodiment.

What is shown in FIG. 3 is an improvement of the structure shown in FIG. 1. In FIG. 3, the same symbols as those in FIG. 1 indicate identical parts with those in FIG. 1.

The structure shown in FIG. 3 is a structure which is effective when the horizontal angle of view is set to be 0° in a region 302.

In this case, in a region 301 as well as a region 303, the horizontal angle of view has a predetermined value (a predetermined value not 0).

Then the horizontal dimensions b and c of pixels are set in correspondence with the angle of view. With this arrangement, the visual horizontal dimensions of all the pixels can be identical with a value a. In other words, the visual horizontal dimensions of all the pixels can be made identical, or a difference therebetween can be made small to the degree where the difference can be ignored.

Third Embodiment

A third embodiment shows a manufacturing process of integrating an active matrix region and a peripheral drive circuit on a single glass substrate or quartz substrate. Employing the manufacturing process described in this embodiment, there can be obtained an active matrix liquid-crystal panel of a peripheral drive circuit integrated type as shown in FIG. 1 or 3.

Figure 5A:
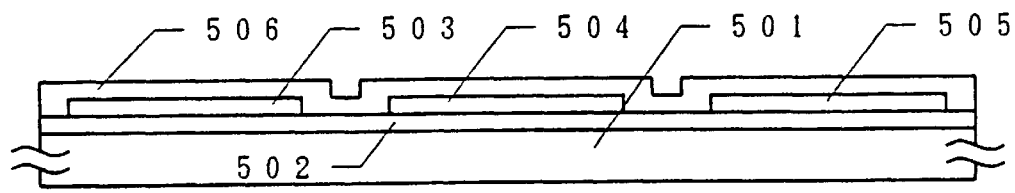
FIGS. 5A to 5E are diagrams showing a process of manufacturing a thin-film transistor which is disposed in a liquid-crystal panel in the third embodiment.

First, as shown in FIG. 5A, a silicon oxide film 502 is formed in thickness of 3000 Å on a glass substrate 501 as a base film by the sputtering method.

Subsequently, an amorphous silicon film not shown is formed in thickness of 400 Å through the low pressure CVD method. Further, with application of a laser beam to the amorphous silicon film, a crystalline silicon film (not shown) is obtained. Then, the crystalline silicon film is patterned to form silicon islands indicated by reference numerals 503, 504 and 505 in FIG. 5A.

Those silicon islands are formed into an active layer of a thin-film transistor. In this example, the silicon island 503 is formed into an active layer of an NMOS (n-channel thin-film MOS transistor) that forms the CMOS structure of the peripheral drive circuit.

Also, the silicon island 504 is formed into an active layer of an PMOS (p-channel thin-film MOS transistor) that forms the CMOS structure of the peripheral drive circuit.

Further, the silicon island 505 is formed into an active layer of an NMOS (n-channel thin-film MOS transistor) that forms the NMOS structure disposed in the pixels.

Figure 5B:
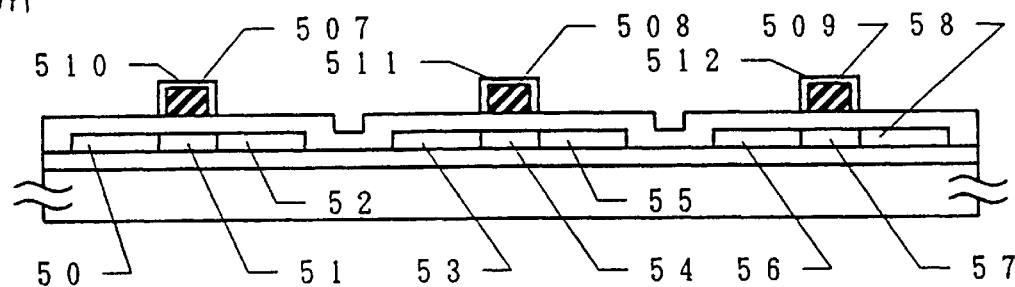

With the above structure, a state shown in FIG. 5A is obtained. Then, patterns 507, 508 and 509 of a gate electrode which is made of aluminum are formed as shown in FIG. 5B.

In this example, an aluminum film containing scandium 0.18 wt % is formed in thickness of 4000 Å by the sputtering method. The reason that scandium is contained in the aluminum film is because a protrusion such as hillock or whisker is restrained from being formed through an abnormal growth of aluminum.

After the formation of the aluminum film, an anodic oxide film not shown having a fine quality on its surface is formed in thickness of about 100 Å.

In this example, an electrolyte as used is ethylene glycol solution containing 3% of tartaric acid which is neutralized with ammonium water. Then, in the electrolyte, a current is allowed to flow between a cathode made of platinum and an anode made of aluminum, thereby being capable of forming an anodic oxide film on the surface of the aluminum film.

The anodic oxide film has a fine rigid quality and provides a function of enhancing the adhesion between a resist mask which will be formed later and the aluminum film. The thickness of the anodic oxide film can be roughly controlled by apply voltage.

After the aluminum film not shown on which the anodic oxide film not shown is formed is obtained, a resist film is formed on its surface, and patterning is performed using the mask. In this way, gate electrode patterns indicated by reference numerals 507, 508 and 509 in FIG. 5B are obtained.

After the gate electrode patterns 507, 508 and 509 are obtained, an anodic oxide film is again formed. The formation of anodic oxide film is similarly conducted by using ethylene glycol solution containing 3% of tartaric acid which is neutralized with ammonium water as an electrolyte.

In this example, the thickness of the anodic oxide film is set to 1000 Å. The anodic oxide film has a function of electrically and physically protects the surface of the gate electrode made of aluminum.

Then, impurities that give conductivity are doped using as a mask the gate electrode and the anodic oxide film on its surface . In this process, a resist mask is selectively disposed, and doping of P (phosphorus) and B (boron) is alternately selectively conducted through the plasma doping method to form n-type regions 50, 52, 56 and 58. Also, p-type regions 53 and 55 are formed.

After completion of doping, a laser beam is irradiated to activate the doped impurities and to anneal damages caused at the time of doping.

In this example, the region 50 is formed into a source region of the NMOS, the region 52 is formed into a drain region of the NMOS, the region 53 is formed into a drain region of the PMOS, and the region 55 is formed into a source region of the PMOS. Also, the region 56 is formed into a drain region of the NMOS, and the region 58 is formed into a source region of the NMOS. Further, the regions 51, 54 and 57 are formed into channel region of the respective thin-film transistors.

In this way, a state shown in FIG. 5B is obtained. Then, a silicon nitride film 513 that constitutes a first interlayer insulation film is formed in thickness of 2000 Å through the plasma CVD method. The first interlayer insulation film can be replaced with silicon oxide, silicon nitride oxide or so on.

Furthermore, a film 514 which is made of a polyimide resin which forms the first interlayer insulation film is formed through the spin coating method. The polyimide resin can be replaced by polyamide, polyimide-amide, and so on. In this example, the reason why a resin material is used for the interlayer insulation film is because its surface can be flattened.

Figure 5C:
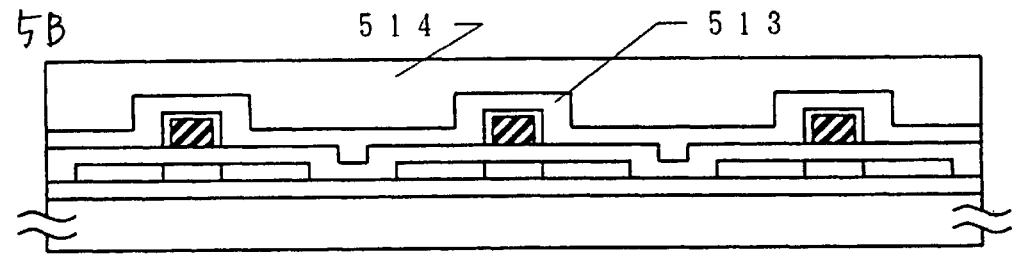

In this way, a state shown in FIG. 5C is obtained. Then, contact holes are formed to electrodes 515, 516, 517 and 518 which are formed by the laminate films consisting of a titanium film, an aluminum film and a titanium film.

In this example, the thickness of the titanium film is set to 1000 Å and the thickness of the aluminum film is set to 2000 Å. Also, the respective films are formed by the sputtering method.

In this state, a CMOS circuit that constitutes the peripheral drive circuit is formed. Also, the electrode 518 is a wiring being extended from a source line of the active matrix circuit or a source line.

Figure 5D:
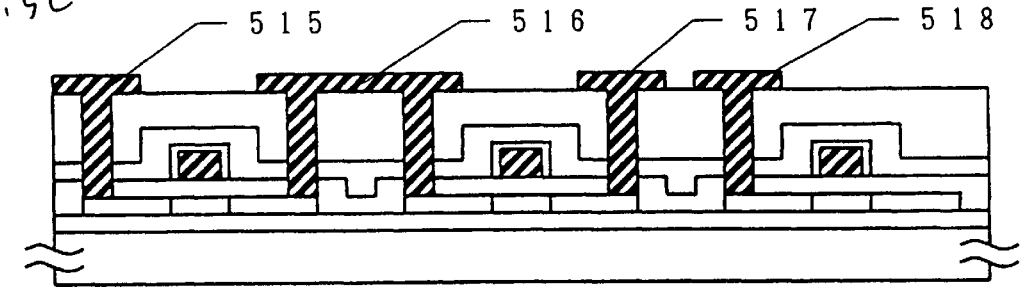

In this way, a state shown in FIG. 5D is obtained. Then, a second interlayer insulation film 519 made of polyimide resin is formed. Then, contact holes are formed to form a pixel electrode 520 made of ITO.

Figure 5E:
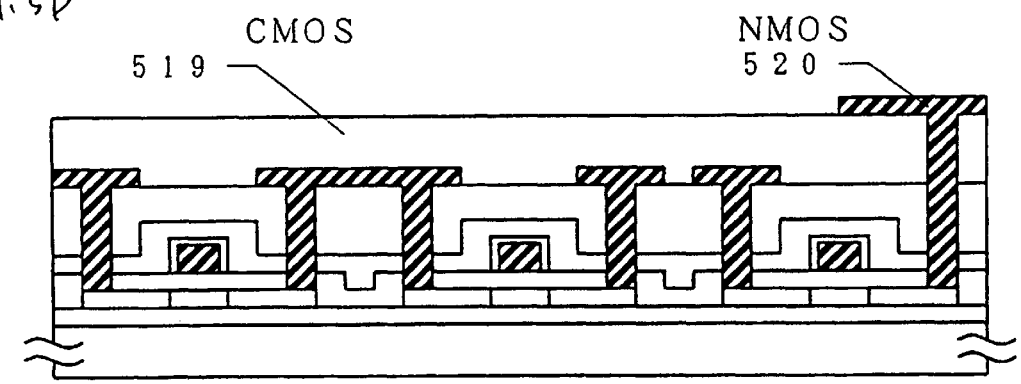

In this way, a state shown in FIG. 5E is obtained. Then, after the state shown in FIG. 5E is obtained, a heat treatment is conducted in a hydrogen atmosphere of 350° C. for one hour. Then, an oriented film not shown for orienting liquid crystal is formed, and an orientation process is conducted on the oriented film.

Furthermore, an opposite substrate prepared separately and a TFT substrate shown in FIG. 8E which are not shown are bonded to each other, and liquid crystal is injected into a gap therebetween, thus obtaining an active matrix liquid-crystal display unit of the peripheral drive circuit integrated type.

As was described above, the display system according to the present invention can solve such a problem that the effective area of pixels (visual area) is changed depending on the horizontal angle of view in the head mount display.

Furthermore, although the specification of the present invention is described with a variation of a horizontal dimension of a pixel in an active matrix type liquid crystal display panel, it is also effective that a vertical dimension of pixels is continuously or gradually varied, if necessary. In such case, the first or second embodiment of the instant invention can be applied to vary the vertical dimension of the pixels. Also, the active matrix type liquid crystal display panel in such case includes a thin film transistor formed through the third embodiment of the present invention.

What is claimed is:

1. A display system adapted to be mounted on a head of an operator, said system comprising:
a pair of flat panel displays for right and left eyes, each of the flat panel displays comprising an active matrix display;

a first plurality of wirings and a second plurality of wirings, in the active matrix display, forming a lattice;

a plurality of pixels in the active matrix display, said plurality of pixels surrounded by said first and said second plurality of wirings;

a plurality of thin film transistors, each transistor formed at an intersection of each of said first and said second plurality of wirings, wherein a horizontal dimension of said pixels of each of the flat panel displays is continuously or gradually varied by changing lengths of said first plurality of wirings according to a horizontal angle of view from a predetermined position.

2. A display system adapted to be mounted on a head of an operator, said system comprising:

a pair of flat panel displays for right and left eyes, each of the flat panel displays comprising an active matrix display;

a first plurality of wirings and a second plurality of wirings, in the active matrix display, forming a lattice;

a plurality of pixels in the active matrix display, said plurality of pixels surrounded by said first and said second plurality of wirings;

a plurality of thin film transistors, each transistor formed at an intersection of each of said first and said second plurality of wirings, wherein an area of said pixels of each of the flat panel displays is continuously or gradually varied by changing lengths of said first plurality of wirings according to a horizontal angle of view from a predetermined position.

3. A display system adapted to be mounted on a head of an operator, said system comprising:

a pair of flat panel displays for right and left eyes;

an active matrix liquid crystal display in each of said flat panel displays, said active matrix liquid crystal display being integrated with a peripheral drive circuit;

a first plurality of wirings and a second plurality of wirings, in the active matrix display, forming a lattice;

a plurality of pixels in the active matrix display having horizontal dimensions, said plurality of pixels being surrounded by said first and said second plurality of wirings;

a plurality of thin film transistors, each transistor formed at an intersection of each of said first and said second plurality of wirings, wherein the peripheral drive circuits are formed symmetrically with respect to a line in said flat panel displays for right and left eyes and wherein said horizontal dimensions of said pixels are varied by changing lengths of said first plurality of wirings.

4. A display system according to claim 3 wherein said horizontal dimensions of said pixels is continuously or gradually changed according to the horizontal angle of view from a predetermined position.

5. A display system according to claim 3 wherein an area of said pixels is continuously or gradually changed according to the horizontal angle of view from a predetermined position.

6. A display device comprising:

a pair of first and second flat panel displays for right and left eyes, respectively, each of the first and second flat panel displays comprising an active matrix display;

a first plurality of wirings and a second plurality of wirings, in the active matrix display, forming a lattice;

a plurality of pixels for the active matrix display, said plurality of pixels surrounded by said first and said second plurality of wirings;

a plurality of thin film transistors, each transistor formed at an intersection of each of said first and said second plurality of wirings, wherein horizontal widths of said pixels are continuously or gradually varied by changing lengths of said first plurality of wirings from a portion where a horizontal angle of view is zero.

7. A display system according to claim 1, wherein the active matrix display is one selected from the group consisting of a liquid crystal display, an electro-luminance display and an electro-chromic display.

8. A display system according to claim 2, wherein the active matrix display is one selected from the group consisting of a liquid crystal display, an electro-luminance display and an electro-chromic display.

9. A display system according to claim 3, wherein the active matrix display is one selected from the group consisting of a liquid crystal display, an electro-luminance display and an electro-chromic display.

10. A display system according to claim 6, wherein the active matrix display is one selected from the group consisting of a liquid crystal display, an electro-luminance display and an electro-chromic display.

* * * * *